US012741627B2

(12) United States Patent
Bae

(10) Patent No.: US 12,741,627 B2
(45) Date of Patent: Sep. 22, 2026

(54) SENSOR CORRECTION DEVICE AND METHOD

(71) Applicant: HL KLEMOVE CORP., Incheon (KR)

(72) Inventor: Joon Hyup Bae, Incheon (KR)

(73) Assignee: HL KLEMOVE CORP., Incheon (KR)

( * ) Notice: Subject to any disclaimer, the term of this patent is extended or adjusted under 35 U.S.C. 154(b) by 119 days.

(21) Appl. No.: 18/774,899

(22) Filed: Jul. 16, 2024

(65) Prior Publication Data

US 2025/0276679 A1 Sep. 4, 2025

(30) Foreign Application Priority Data

Mar. 4, 2024 (KR) ........................ 10-2024-0030837

(51) Int. Cl.

*B60W 10/20* (2006.01)
*G01S 17/931* (2020.01)
*G06V 20/58* (2022.01)

(52) U.S. Cl.

CPC .......... *B60W 10/20* (2013.01); *G01S 17/931* (2020.01); *G06V 20/58* (2022.01);
(Continued)

(58) Field of Classification Search

CPC .. B60W 10/20; B60W 30/143; B60W 40/114; B60W 40/02; B60W 50/0205; B60W 50/0225; B60W 2050/0215; B60W 2420/403; B60W 2420/408; B60W 2510/20; B60W 2540/18; B60W 2555/60;
(Continued)

(56) References Cited

U.S. PATENT DOCUMENTS 11,794,723 B2 * 10/2023 Yang .................. B60W 50/085
2016/0251030 A1 * 9/2016 Okada .................. G06T 1/0007
345/633

(Continued)

FOREIGN PATENT DOCUMENTS

JP 2009-264759 11/2009
JP 7206883 1/2023

(Continued)

OTHER PUBLICATIONS

Office Action dated Mar. 6, 2026 for Korean Patent Application No. 10-2024-0030837 and its English translation provided by Applicant's foreign counsel.

*Primary Examiner* — Brandon Z Willis
(74) *Attorney, Agent, or Firm* — WOMBLE BOND DICKINSON (US) LLP

(57) ABSTRACT

The disclosure relates to a sensor correction device and method. Specifically, a sensor correction device according to the disclosure comprises a receiver receiving image information and a first steering angle from a plurality of image sensors and a steering angle sensor (SAS), respectively, an object detector detecting an object from the image information and detecting a position of the object, a comparator comparing a second steering angle calculated based on a position change amount of the object with the first steering angle, and a controller applying an SAS correction value according to the position change amount of the object to the first steering angle when a difference between the first steering angle and the second steering angle is larger than or equal to a first reference value.

20 Claims, 9 Drawing Sheets

(52) U.S. Cl.
CPC . *B60W 2420/403* (2013.01); *B60W 2420/408* (2024.01); *B60W 2540/18* (2013.01); *B60W 2710/207* (2013.01)

(58) Field of Classification Search
CPC ......... B60W 2520/10; B60W 2520/14; B60W 2554/20; B60W 2554/40; B60W 2554/4041; B60W 2710/20; B60W 2710/207; G06V 20/56; G06V 20/58; G06V 20/582; G01S 17/931; G05D 1/80; G05D 1/857; B60Y 2306/15; B62D 5/0481; B62D 5/049; B62D 15/021; B62D 15/024; B62D 15/0245
See application file for complete search history.

(56) References Cited

U.S. PATENT DOCUMENTS

| | | | | |
|---|---|---|---|---|
| 2018/0188739 | A1* | 7/2018 | Tseng | G01S 19/42 |
| 2022/0266840 | A1* | 8/2022 | Kim | B60W 40/114 |

FOREIGN PATENT DOCUMENTS

| | | |
|---|---|---|
| KR | 10-2019-0109663 | 9/2019 |
| KR | 10-2498435 | 2/2023 |
| KR | 10-2023-0080126 | 6/2023 |
| KR | 10-2023-0116210 | 8/2023 |

* cited by examiner 320
no motorcycle
d3
d2
d1
t
t-1
t-2
310

SENSOR CORRECTION DEVICE AND METHOD

CROSS-REFERENCE TO RELATED APPLICATION

This application claims priority from Korean Patent Application No. 10-2024-0030837, filed on Mar. 4, 2024, which is hereby incorporated by reference for all purposes as if fully set forth herein.

BACKGROUND

Field

The present embodiments relate to a sensor correction device and method for assisting a driver's steering.

Description of Related Art

A conventional vehicle steering device is a device for the driver to choose the vehicle's traveling direction and perform manipulation and includes a steering wheel, which is directly manipulated by the driver, and a steering mechanism for transferring the handling direction and force of the steering wheel to the vehicle wheels.

For example, power steering devices have been developed and applied to provide driving convenience in aid of the handling force of the steering wheel and include hydraulic types using hydraulic pressure, electric-hydraulic types using both hydraulic pressure and motor electromotive force, and electric types using motor electromotive force alone, which have been sequentially developed and applied.

Meanwhile, to reduce weight in vehicles, steer-by-wire (SBW) systems have been developed which electrically connect the steering shaft (or column), including the steering wheel and the reaction force motor, with the actuator, including the wheels and rack bar, and transmit the driver's steering force.

Since such a steer-by-wire system does not have a mechanical link between the steering input device and the steering output device, accuracy between the steering angle of the vehicle determined by the steering input device and the steering angle determined by the steering output device is important.

Further, as a difference, although tiny, occurs between the actual value and the value obtained from the sensor, a difference may result when operating the steer-by-wire system.

Accordingly, there is a need for a method for reducing the difference between the sensor value and the actual value.

BRIEF SUMMARY

In the foregoing background, the disclosure provides a sensor correction device and method for determining whether a failure occurs according to the difference between the actual value and the sensor value of the steering angle sensor (SAS) and the vehicle velocity sensor and compensating for the value difference to reduce the difference between the sensor value and the actual value.

To achieve the foregoing objectives, in an aspect, the disclosure provides a sensor correction device comprising a receiver receiving image information and a first steering angle from a plurality of image sensors and a steering angle sensor (SAS), respectively, an object detector detecting an object from the image information and detecting a position of the object, a comparator comparing a second steering angle calculated based on a position change amount of the object with the first steering angle, and a controller applying an SAS correction value according to the position change amount of the object to the first steering angle when a difference between the first steering angle and the second steering angle is larger than or equal to a first reference value.

In another aspect, the disclosure provides a sensor correction method comprising an information reception step receiving image information and a first steering angle from a plurality of image sensors and a steering angle sensor (SAS), respectively, an object detection step detecting an object from the image information and detecting a position of the object, a comparison step comparing a second steering angle calculated based on a position change amount of the object with the first steering angle, and a correction step applying an SAS correction value according to the position change amount of the object to the first steering angle when a difference between the first steering angle and the second steering angle is larger than or equal to a first reference value.

As described above, according to the sensor correction device and method, it is possible to determine whether the SAS, the velocity sensor, and the yaw rate sensor fail by calculating the steering angle, the velocity of the host vehicle, and the yaw rate using other sensor values, and correct the error in each sensor by calculating a correction value.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
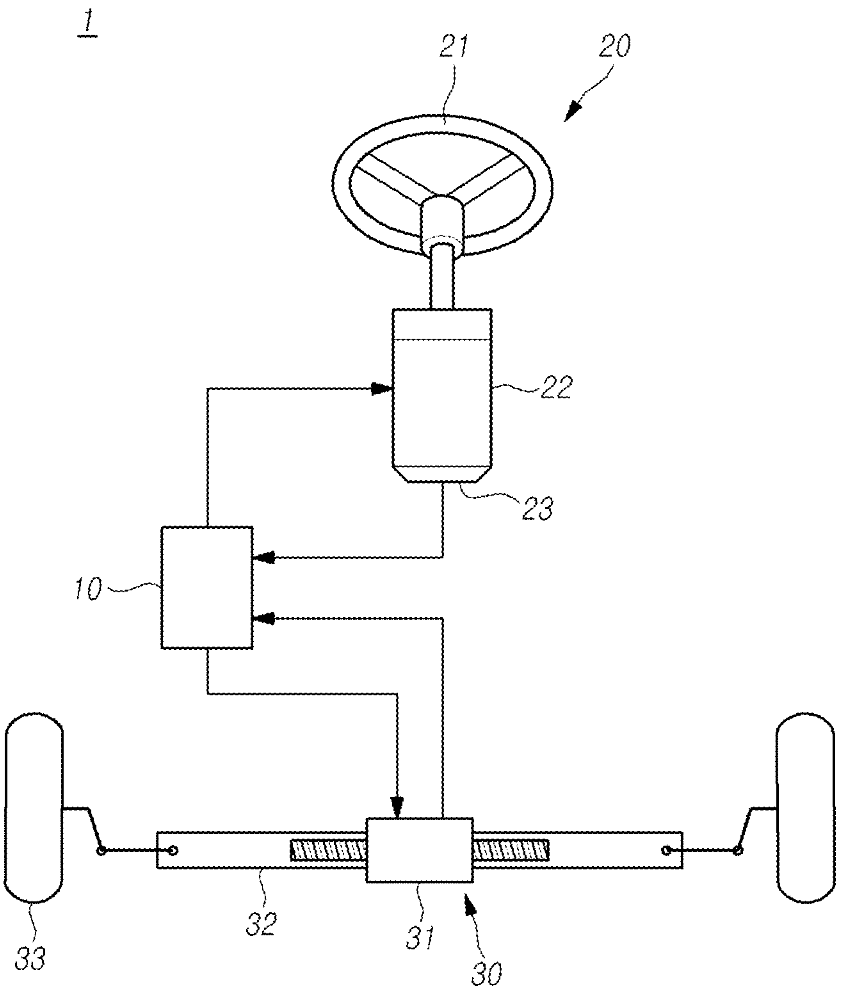
FIG. 1 is a block diagram schematically illustrating a steering control system according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, an embodiment of a steering control system 1 that may perform the function of a sensor correction device 10 and the function of controlling the steering of the vehicle is described.

FIG. 1 is a block diagram schematically illustrating a steering control system 1 according to an embodiment.

Referring to FIG. 1, a steering control system according to an embodiment may include a sensor correction device, a steering feedback actuator (SFA), a road wheel actuator (RUA), and the like.

The steering control system 1 according to an embodiment may mean a system that controls to change the steering of the host vehicle equipped with the steering control system 1 according to the rotation angle of the steering wheel 21 manipulated by the driver.

The steering control system 1 may be a mechanical steering control system 1, which steers the front wheel 33 by transferring the force (torque) generated by the driver turning the steering wheel 21 to the steering motor 31 via a mechanical power transmission device (e.g., linkage) to steer the wheel 223 by the driving of the steering motor 31, or a steer-by-wire (SbW) system, which transfers power by transmitting/receiving electric signals through, e.g., a cable, instead of a mechanical power transmission device, depending on whether the steering input actuator and the steering output actuator is coupled through a mechanical connecting member (or linkage). An example in which the steering control system 1 is an SbW system is described below, but the disclosure is not limited thereto.

The steering control system 1 according to the disclosure as illustrated in FIG. 1 may implement an SbW system with, e.g., an SFA 20, a sensor correction device 10, and an RWA 30. As described above, when the steering control system 1 is an SbW system, the SFA 20 and the RWA 30 may be mechanically separated.

The SFA 20 may refer to a device to which steering information intended by the driver is input. As described above, the SFA 20 may include a steering wheel 21, a steering shaft 22, and a reaction force motor 23. Although not shown, the steering angle information may further include a steering gear for transferring the rotational force of the reaction force motor 23 to the steering shaft 22.

The steering wheel 21 may rotate between a left steering lock end and a right steering lock end with the steering shaft 22 as a rotation axis. Here, the lock end may refer to a limit point where the steering wheel may move.

The reaction force motor 23 may receive a command current from the sensor correction device 10 and provide a feedback torque to the steering wheel 21. In an embodiment, the reaction force motor 23 may receive a command current from the sensor correction device 10 and drive at a rotational speed indicated by the command current to generate a feedback torque, and may transfer the feedback torque to the steering wheel 21 through a worm and a worm wheel.

The SFA 20 may include a steering angle sensor (SAS) detecting a steering angle of the steering wheel, a torque sensor measuring a torque applied to the steering shaft, and a steering angular velocity sensor detecting a steering angular velocity of the steering wheel.

The sensor correction device 10 may receive steering information from each sensor included in the SFA 20 to calculate a control value, and output an electrical signal indicating the control value to the RWA 30. Here, the steering information may mean information including at least one of a steering angle, a steering angular velocity, and a steering torque.

Meanwhile, the sensor correction device 10 may calculate a control value by receiving feedback of power information (e.g., rack position information) actually output from the RWA 30, and output an electrical signal indicating the control value to the SFA 20, thereby providing a sense of steering to the driver.

The RWA 30 may refer to a device that actually drives the vehicle to steer. The RWA 30 may include a steering motor 31, a rack bar 32, a front wheel 33, a vehicle velocity sensor, a rack position sensor, and the like. Here, the front wheel 33 may instead be replaced by the rear wheel (not shown) depending on the driving method of the host vehicle.

The SFA 20 and the RWA 30 may further include a motor torque sensor capable of detecting the motor torque of the reaction force motor 23 and the steering motor 31.

The steering motor 31 may axially move the rack bar 32. Specifically, the steering motor 31 may receive a command current from the sensor correction device 10 and thus drive, and may allow the rack bar 32 to linearly move in the axial direction. In other words, the rack bar 32 may linearly move between the left lock end, which is the left movement limit point, and the right lock end, which is the right movement limit point.

As driven by the steering motor 31, the rack bar 32 may perform a linear motion which allows the front wheels 33 to turn to the left or right.

Meanwhile, when the steering control system 1 is an SbW system and the vehicle travels in the autonomous driving mode, the steering control system 1 may control only the RWA 30 to perform steering control of the vehicle, or control both the SFA 20 and the RWA 30 to perform steering control of the vehicle.

The sensor correction device according to the disclosure may determine a target position of the rack bar 32 corresponding to the steering angle of the steering wheel 21 detected by the SFA 20, and control the steering motor 31 so that the rack bar 32 is situated at the target position. As the rack bar 32 is situated at the target position, the steering angle of the front wheel 33 interlocked with the rack bar 32 may change. In other words, the sensor correction device 10 according to the disclosure may implement synchronization between the steering angle of the SFA and the steering angle of the RWA.

In an embodiment, the sensor correction device 10 may include a first steering control module for controlling the reaction force motor 23 of the SFA 20 and a second steering control module for controlling the steering motor 31 of the RWA 30. The first steering control module and the second steering control module may transmit/receive data such as the steering angle of the SFA and the steering angle of the RWA through a private CAN. Each of the first steering control module and the second steering control module may be implemented as a microcomputer (also referred to as 'micom') or an electronic control unit (ECU).

In an embodiment, the sensor correction device may be an advanced driver assistance systems (ADAS) that provides information for assisting driving of the vehicle or provides assistance for controlling the vehicle.

Here, ADAS may refer to various types of advanced driver assistance systems and may include, e.g., autonomous emergency braking, smart parking assistance system (SPAS), blind spot detection (BSD), adaptive cruise control (ACC), lane departure warning system (LDWS), lane keeping assist system (LKAS), and lane change assist system (LCAS). However, embodiments of the disclosure are not limited thereto.

Hereinafter, a sensor correction device according to an embodiment of the disclosure is described with reference to the accompanying drawings.

Figure 2:
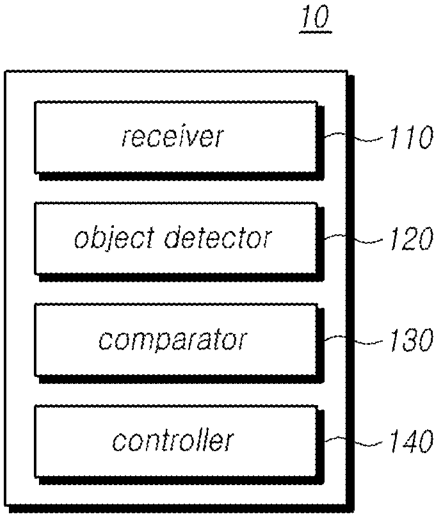
FIG. 2 is a block diagram illustrating a sensor correction device according to an embodiment of the disclosure.

FIG. 2 is a block diagram illustrating a sensor correction device 10 according to an embodiment of the disclosure.

Referring to FIG. 2, a sensor correction device 10 according to the disclosure may include a receiver 110, an object detector 120, a comparator 130, a controller 140, and the like.

The sensor correction device 10 according to the disclosure may receive image information and a first steering angle from a plurality of image sensors and a steering angle sensor (SAS), respectively, detect an object from the image information, detect a position of the object, compare a second steering angle calculated based on a position change amount of the object with the first steering angle, and when a difference between the first steering angle and the second steering angle is larger than or equal to a first reference value, apply an SAS correction value according to the position change amount of the object to the first steering angle.

The receiver 110 may receive the image information and the first steering angle from the plurality of image sensors and the SAS, respectively. Here, the plurality of image sensors may include a camera sensor, a LiDAR sensor, a radar sensor, and the like. Accordingly, the receiver 110 may receive the first image information from the camera sensor and the second image information from the LiDAR sensor.

The receiver 110 may receive sensing information from the plurality of sensors mounted in the vehicle 310, but is not limited thereto. For example, the receiver 110 may receive data from an external server, a terminal, or another vehicle through a wireless network from the outside of the host vehicle 310 through the communication module.

The object detector 120 may detect an object from image information and detect the position of the object. Here, the image information may include first image information received from the camera sensor and second image information received from the LiDAR sensor. The object detector 120 may detect an object based on the first image information and may detect the position of the detected object based on the second image information.

Specifically, the object detector 120 may include an artificial neural network model that detects a feature point from image data and detects an object from the feature point. The object detector 120 may detect an object from the image data and classify the type (class) of the object by learning in the artificial neural network model.

For example, the object detector 120 may include an artificial neural network model such as a convolutional neural network (CNN), a generative adversarial networks (GAN) CNN, a you only look once (YOLO), a recurrent neural network (RNN), or the like.

The object detector 120 may determine whether the object is a stationary object or a moving object. For example, whether the object is a stationary object may be determined based on the second image information. The receiver 110 may determine whether the object is a stationary object using third image information received from the radar sensor.

Further, the object detector 120 may determine whether the object classified according to the type of the classified object is a stationary object or a moving object. For example, when the type of the object classified by the object detector 120 is a traffic sign 320, the object detector 120 may determine that the object is a stationary object. As another example, when the type of the classified object is a pedestrian, the object detector 120 may determine that the object is a moving object.

The comparator 130 may compare the second steering angle calculated based on the position change amount of the object with the first steering angle. Here, the comparator 130 may calculate the position change amount of the object based on the position information about the object obtained from the second image information.

Figure 3:
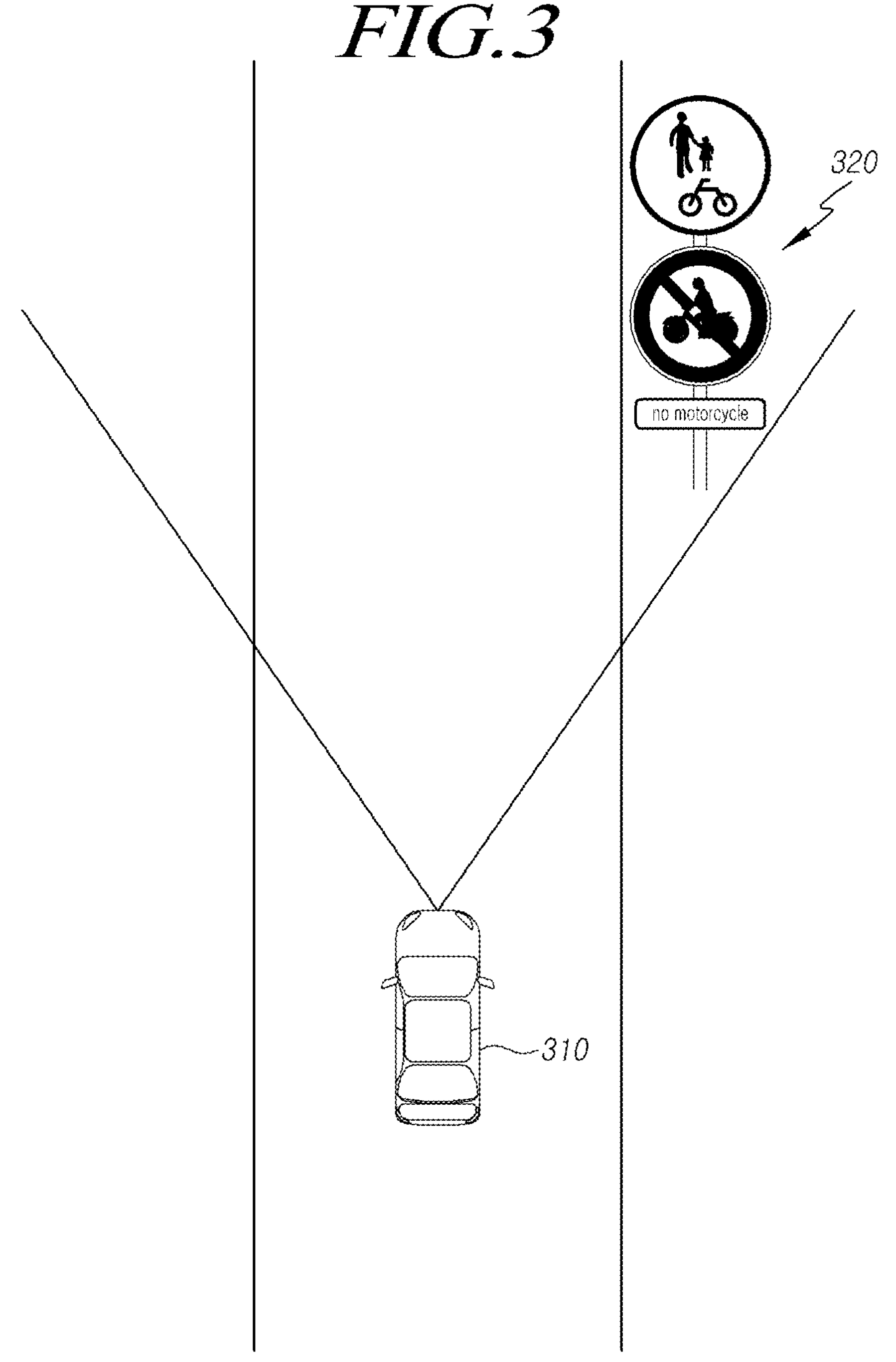
FIG. 3 is a diagram illustrating a sensor value correction condition according to an embodiment.

FIG. 3 is a diagram illustrating a sensor value correction condition according to an embodiment.

Referring to FIG. 3, the comparator 130 may calculate the second steering angle and compare the calculated second steering angle with the first steering angle only when the object detected from the image information is a stationary object.

Specifically, the comparator 130 may calculate the second steering angle and compare the calculated second steering angle with the first steering angle only when the object which is the stationary object is classified as a traffic sign 320. The second steering angle may be used when determining whether to correct the first steering angle by comparing the above-described first steering angle with the steering angle calculated using other sensors than the steering angle detected by the SAS. Accordingly, a more accurate sensor value is required for the second steering angle, and a more accurate sensor value may be calculated when the object is a stationary object than the moving object. Further, since the traffic sign 320 is typically fixed to the ground to provide information, it is suitable for calculating the second steering angle.

Figure 4:
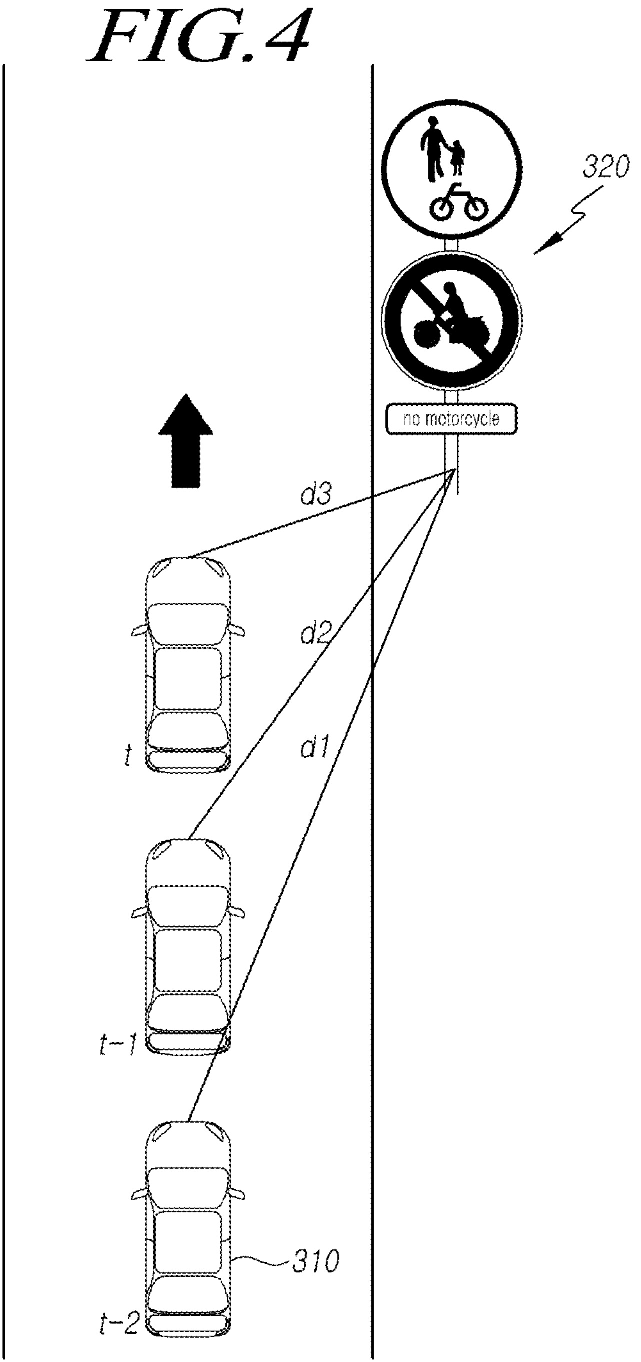
FIG. 4 is a view illustrating calculating a position change amount of an object, according to an embodiment.

FIG. 4 is a view illustrating calculating a position change amount of an object, according to an embodiment.

Referring to FIG. 4, the comparator 130 may be calculated based on position information about an object included in the second image information. The position change amount of the object may be calculated based on the sensing period of the LiDAR sensor.

Specifically, the comparator 130 may calculate the second steering angle with the position change amount of the object that changes according to the sensing period of the LiDAR sensor. Here, it is assumed that the host vehicle 310 is moving. The sensing period of the LiDAR sensor may be, e.g., 30 ms, but is not limited thereto.

Accordingly, as the host vehicle 310 moves (t−2, t−1, t), the distances d1, d2, and d3 between the host vehicle 310 and the object may change, and the time interval may be the sensing period of the LiDAR sensor. In other words, the comparator 130 may calculate the position change amount of the object by dividing the position change value for the object by the LiDAR sensing period, and calculate the steering angle of the host vehicle 310 which is the second steering angle and the vehicle velocity of the host vehicle 310 which is the second velocity.

Accordingly, the disclosure may identify whether there is an error in the sensor values of the SAS sensor and the vehicle velocity sensor by calculating the steering angle and the vehicle velocity using other sensor values.

Figure 5:
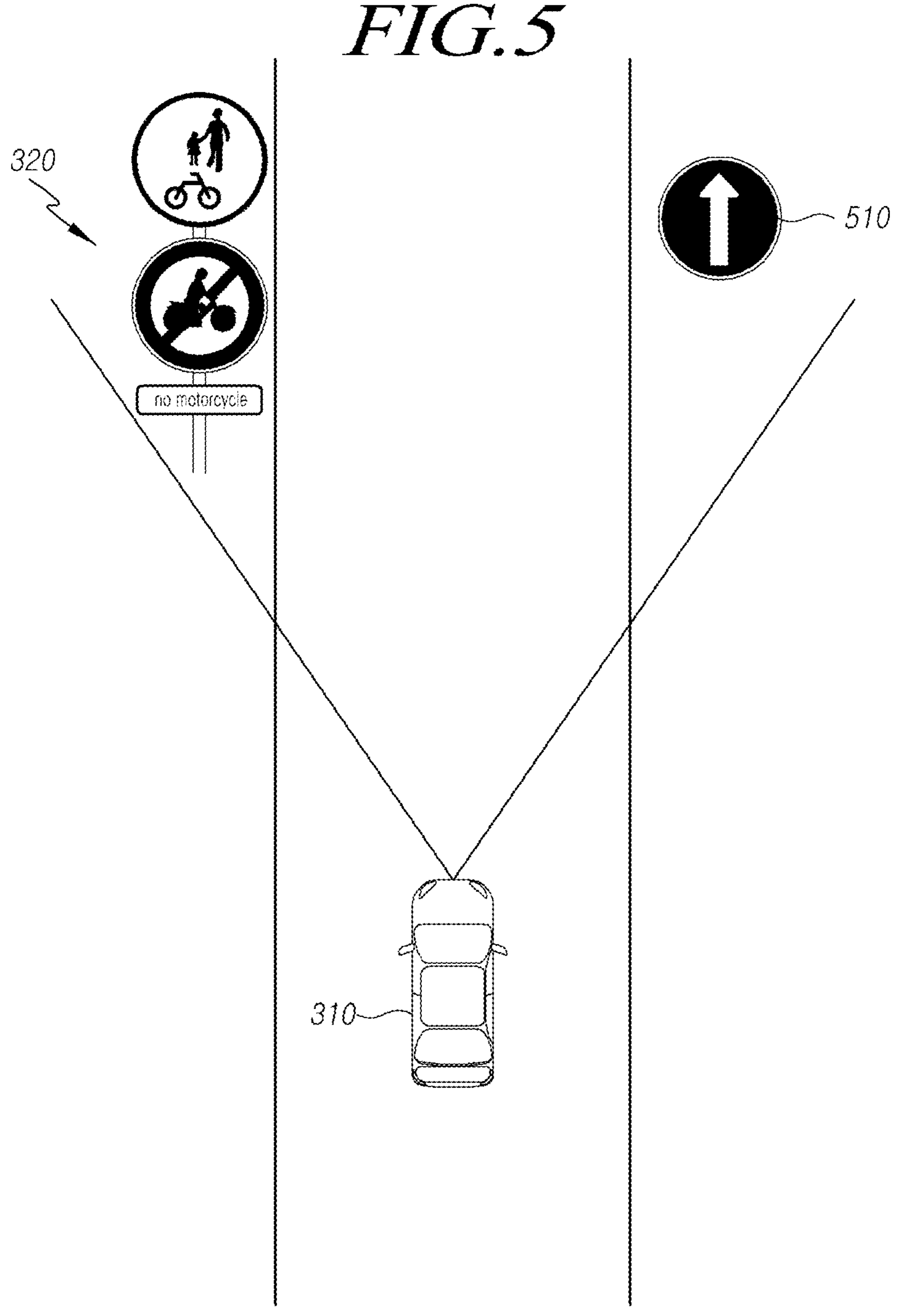
FIG. 5 is a view illustrating calculating a second steering angle when a plurality of objects are detected in image information, according to an embodiment.

FIG. 5 is a view illustrating calculating a second steering angle when a plurality of objects are detected in image information, according to an embodiment.

Referring to FIG. 5, the comparator 130 may calculate the second steering angle and compare the calculated second steering angle with the first steering angle only when the classified object is detected as the traffic sign 320. Specifically, the comparator 130 may calculate the second steering angle and compare the calculated second steering angle with the first steering angle only when the traffic sign 320 includes a go-straight signal.

In the case of the traffic sign 320 including the go-straight signal, since the steering angle of the host vehicle 310 does not change, more accurate steering angle comparison is possible, and a quick comparison result may be obtained.

When a plurality of objects are detected, the comparator 130 may select any one object according to a predetermined priority and calculate the position change amount for the selected object. For example, when a stationary object and a moving object are detected in the image information, the comparator 130 may select the stationary object. As another example, when the plurality of stationary objects detected from the image information are classified as a traffic sign 320 and another vehicle, the comparator 130 may select the object classified as the traffic sign 320.

Accordingly, the disclosure may calculate a more accurate second steering angle.

When a plurality of objects are detected, the comparator 130 may calculate the second steering angle based on the average of the respective position change amounts for the objects.

Accordingly, the disclosure may calculate a second steering angle more accurate than the second steering angle calculated from one object.

When the difference between the first steering angle and the second steering angle is larger than or equal to a first reference value, the controller 140 may apply the SAS correction value according to the position change amount of the object to the first steering angle. The SAS correction value may be a value applied so that the first steering angle becomes the second steering angle. In other words, if the SAS correction value is applied to the first steering angle, the second steering angle may be calculated. This correction value may be applied when the disclosure implements an ADAS function using a steering angle.

In an embodiment, in the disclosure, the receiver 110 may further receive a first velocity of the host vehicle 310 from the vehicle velocity sensor, the comparator 130 may compare the first velocity with the second velocity calculated based on the position change amount of the object, and when the difference between the first velocity and the second velocity is larger than or equal to a second reference value, the controller 140 may apply a velocity correction value according to the position change amount of the object to the first velocity.

As described above, in the disclosure, when the position change amount of the object is calculated, the second velocity is calculated, and it is possible to determine whether there is an error in the vehicle velocity by comparing the second velocity with the first velocity detected by the vehicle velocity sensor.

Accordingly, the disclosure may apply the calculation of the correction value of the vehicle velocity in the same manner as in the above-described embodiment of calculating the second steering angle, the embodiment for comparing the first steering angle and the second steering angle, and the embodiment of calculating the correction value of the first steering angle. For example, the comparator 130 may calculate the second velocity and compare the calculated second velocity with the first velocity only when the object is a stationary object. As another example, when a plurality of objects are detected, the comparator 130 may calculate the second velocity based on the average of the respective position change amounts for the objects.

Like for the above-described velocity correction value, in another embodiment, in the disclosure, the receiver 110 may further receive a first yaw rate of the host vehicle 310 from the yaw rate sensor, the comparator 130 may compare the first yaw rate with the second yaw rate calculated based on the position change amount of the object, and when the difference between the first yaw rate and the second yaw rate is larger than or equal to a third reference value, the controller 140 may apply a yaw rate correction value according to the position change amount of the object to the second yaw rate.

As described above, the sensor correction device 10 according to the disclosure may determine whether the SAS, the velocity sensor, the yaw rate sensor, or the like fails according to the position change amount of the object according to the sensor period, and when correction is required, the correction value may be calculated and applied to the SAS, the velocity sensor, the yaw rate sensor, or the like.

Figure 6:
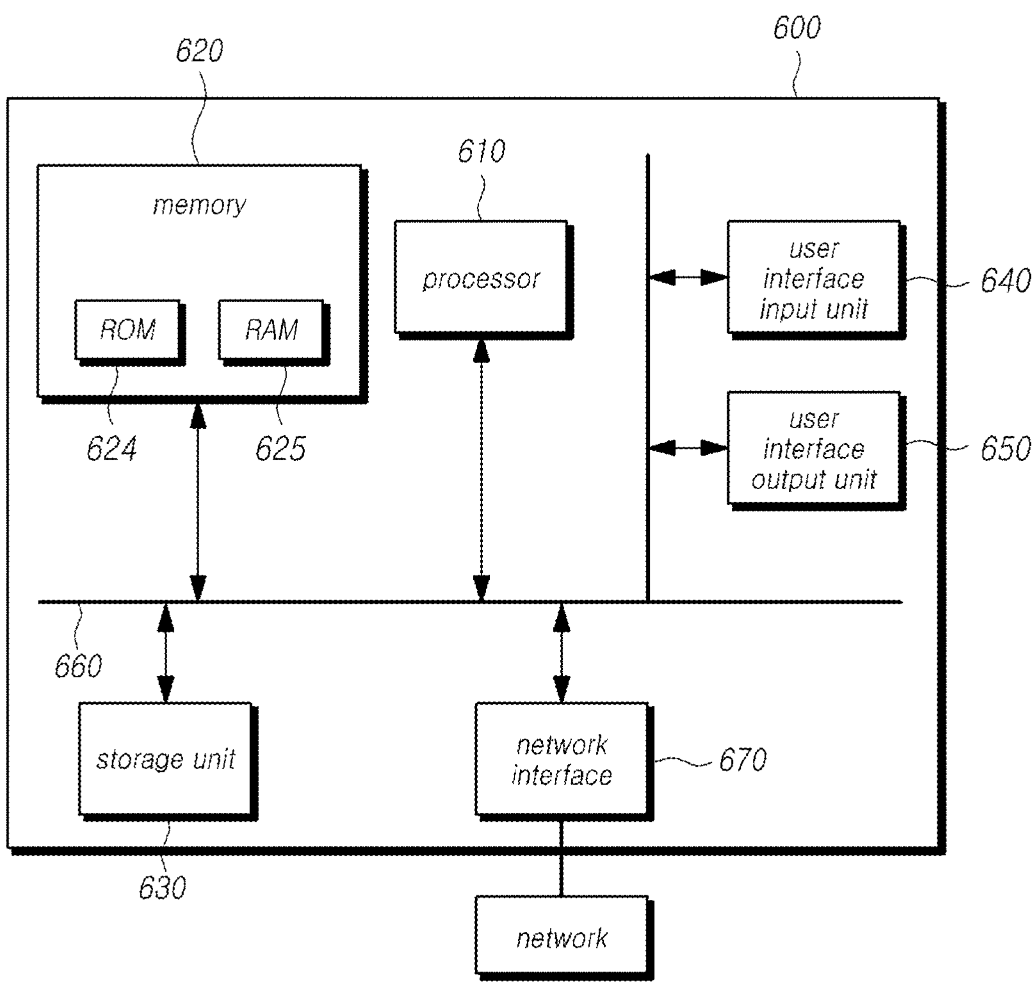
FIG. 6 is a block diagram illustrating a sensor correction device according to another embodiment of the disclosure.

FIG. 6 is a block diagram illustrating a sensor correction device 10 according to another embodiment of the disclosure.

721 The above-described embodiments of the disclosure may be implemented as, e.g., a computer-readable recording medium, in a computer system. Referring to FIG. 6, the computer system 600, such as the sensor correction device 10, may include at least one of one or more processors 610, a memory 620, a storage unit 630, a user interface input unit 640, and a user interface output unit 650 which may communicate with each other via a bus 660. The computer system 600 may further include a network interface 670 for connecting to a network. The processor 610 may be a central processing unit (CPU) or semiconductor device that executes processing instructions stored in the memory 620 and/or the storage unit 630. The memory 620 and the storage unit 630 may include various types of volatile/non-volatile storage media. For example, the memory 1200 may include a read only memory (ROM) 624 and a random access memory (RAM) 625.

Described below is a sensor correction method using the sensor correction device 10 capable of performing the above-described embodiments of the disclosure.

Figure 7:
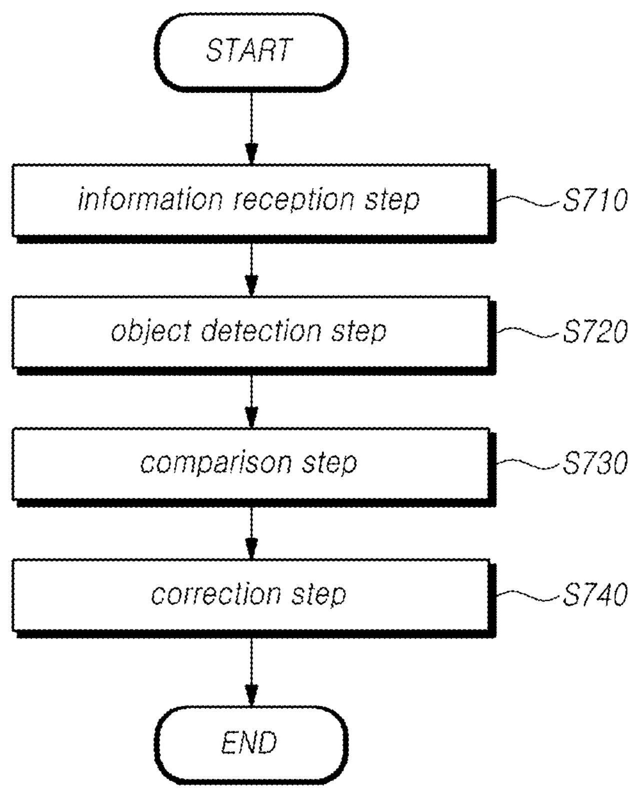
FIG. 7 is a flowchart illustrating a sensor correction method according to an embodiment of the disclosure.

FIG. 7 is a flowchart illustrating a sensor correction method according to an embodiment of the disclosure.

Referring to FIG. 7, a sensor correction method according to an embodiment of the disclosure may include an information reception step S710 of receiving image information and a first steering angle from a plurality of image sensors and a steering angle sensor (SAS), respectively, an object detection step S720 of detecting an object from the image information and detecting a position of the object, a comparison step S730 of comparing a second steering angle calculated based on a position change amount of the object with the first steering angle, and a correction step S740 of, when a difference between the first steering angle and the second steering angle is larger than or equal to a first reference value, applying an SAS correction value according to the position change amount of the object to the first steering angle. Here, the image sensors may include a camera sensor and a LiDAR sensor. The image information may include first image information received from the camera sensor and second image information received from the LiDAR sensor. The position change amount of the object may be calculated based on the sensing period of the LiDAR sensor.

The object detection step S720 may determine whether the object is a stationary object or a moving object. The comparison step S730 may calculate the second steering angle and compare the calculated second steering angle with the first steering angle only when the object is a stationary object.

The object detection step S720 may detect the type (class) of the object. The comparison step S730 may calculate the second steering angle and compare the calculated second steering angle with the first steering angle only when the object is detected as the traffic sign 320.

Accordingly, the disclosure may apply a more accurate SAS correction value by calculating a more accurate second steering angle.

The comparison step S730 may calculate the second steering angle and compare the calculated second steering angle with the first steering angle only when the traffic sign includes a go-straight signal.

The object detection step S720 may detect the type of the object based on the first image information and may detect the distance between the object and the host vehicle 310 based on the second image information.

When a plurality of objects are detected, the comparison step S730 may select any one object according to a predetermined priority and calculate the position change amount for the selected object.

When a plurality of objects are detected, the comparison step S730 may calculate the second steering angle based on the average of the respective position change amounts for the objects.

In the sensor correction method according to the disclosure, the information reception step S710 may further receive a first velocity of the host vehicle 310 from the vehicle velocity sensor, the comparison step S720 may compare the first velocity with the second velocity calculated based on the position change amount of the object, and when the difference between the first velocity and the second velocity is larger than or equal to a second reference value, the correction step S740 may apply a velocity correction value according to the position change amount of the object to the first velocity.

In the disclosure, the information reception step S710 may further receive a first yaw rate of the host vehicle 310 from the yaw rate sensor, the comparison step S720 may compare the first yaw rate with the second yaw rate calculated based on the position change amount of the object, and when the difference between the first yaw rate and the second yaw rate is larger than or equal to a third reference value, the correction step S740 may apply a yaw rate correction value according to the position change amount of the object to the first yaw rate.

As described above, the disclosure may calculate the velocity of the host vehicle 310 and the yaw rate of the host vehicle 310 without detection by the vehicle velocity sensor and the yaw rate sensor based on the position change amount of the object. Accordingly, the disclosure may apply a method for calculating an SAS correction value to the velocity correction value and the yaw rate correction value.

Figure 8:
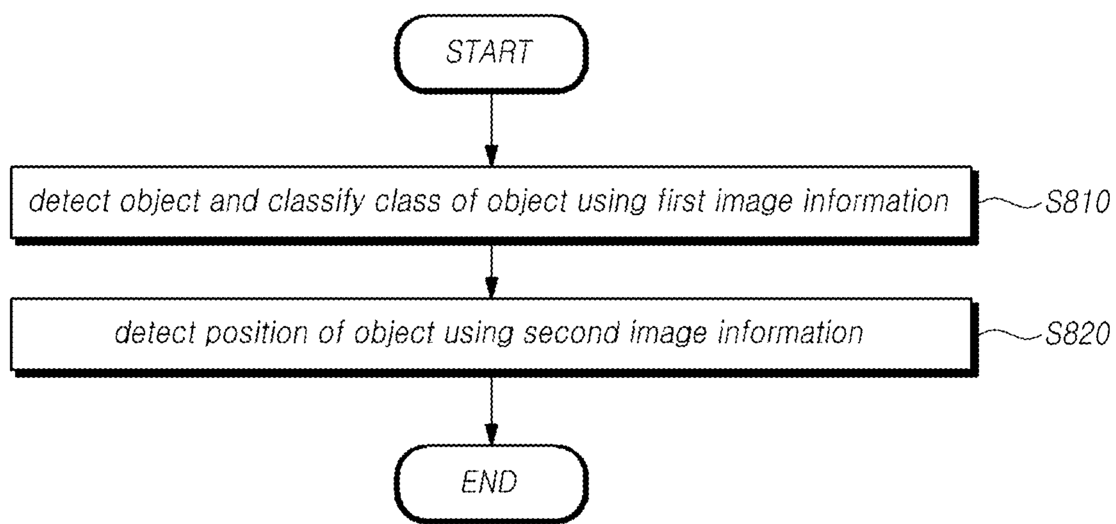
FIG. 8 is a view more specifically illustrating step S720 according to an embodiment.

FIG. 8 is a view more specifically illustrating step S720 according to an embodiment.

Referring to FIG. 8, the sensor correction device 10 may receive image information and detect an object and classify the type of the object using the first image information (S810).

The sensor correction device 10 may classify the type of the object detected through the artificial neural network model. Here, the first image information received from the camera sensor may provide ease to detect an object or classify the type of the object.

The sensor correction device 10 may detect the position of the object using the second image information (S820). The LiDAR sensor may identify the correct position if the detected object may be identified by the nature of the LiDAR sensor. Accordingly, the second image information received from the LiDAR sensor may more accurately detect the position of the object. Here, when the object is identified, sensor fusion using the result of the first image information may be performed.

Figure 9:
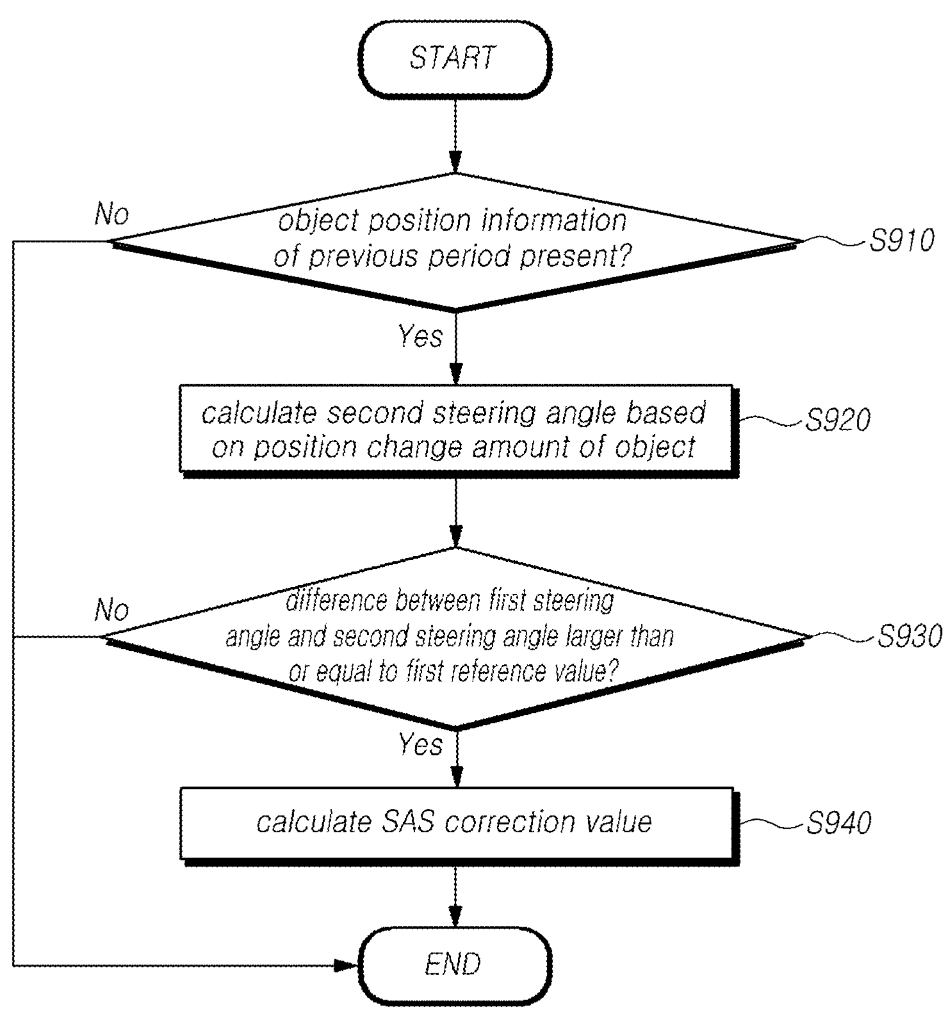
FIG. 9 is a view illustrating steps S730 and S740 in more detail, according to an embodiment.

FIG. 9 is a view illustrating steps S730 and S740 in more detail, according to an embodiment.

Referring to FIG. 9, the sensor correction device 10 may determine whether object position information of a previous period is present (S910).

Accordingly, when the object position information of the previous period is present (Yes in S910), the sensor correction device 10 may calculate the position change amount of the object according to the object position information of the previous period.

Then, the sensor correction device 10 may calculate the second steering angle based on the position change amount of the object (S920).

When the object position information of the previous period is not present (No in S910), the sensor correction device 10 may store the object position information of the current period and wait to receive the image information of the next period.

The sensor correction device 10 may determine whether the difference between the first steering angle and the second steering angle is larger than or equal to a first reference value (S930).

When the difference between the first steering angle and the second steering angle is larger than or equal to the first reference value (Yes in S930), the sensor correction device 10 may calculate the SAS correction value (S940). Here, the SAS correction value may be calculated as a value for the first steering angle to be the second steering angle.

When the difference between the first steering angle and the second steering angle is less than the first reference value (No in S930), the sensor correction device 10 may determine that the sensor value of the SAS is accurate.

As described above, according to the disclosure, it is possible to determine whether the SAS, the velocity sensor, and the yaw rate sensor fail by calculating the steering angle, the velocity of the host vehicle, and the yaw rate using other sensor values, and correct the error in each sensor by calculating a correction value.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A sensor correction device, comprising a processor configured to:

receive image information and a first steering angle from a plurality of image sensors and a steering angle sensor (SAS), respectively;

detect an object from the image information and detecting a position of the object;

compare a second steering angle calculated based on a position change amount of the object with the first steering angle; and apply an SAS correction value according to the position change amount of the object to the first steering angle when a difference between the first steering angle and the second steering angle is larger than or equal to a first reference value.

2. The sensor correction device of claim 1, wherein the processor determines whether the object is a stationary object or a moving object, and wherein the processor calculates the second steering angle and compares the calculated second steering angle with the first steering angle only when the object is the stationary object.

3. The sensor correction device of claim 1, wherein the processor detects a class of the object, and wherein the processor calculates the second steering angle and compares the calculated second steering angle with the first steering angle only when the object is detected as a traffic sign.

4. The sensor correction device of claim 3, wherein the processor calculates the second steering angle and compares the calculated second steering angle with the first steering angle only when the traffic sign includes a go-straight signal.

5. The sensor correction device of claim 1, wherein the image sensor includes a camera sensor and a LiDAR sensor, and wherein the image information includes first image information received from the camera sensor and second image information received from the LiDAR sensor.

6. The sensor correction device of claim 5, wherein the processor detects a class of the object based on the first image information and detects a distance between the object and a host vehicle based on the second image information.

7. The sensor correction device of claim 5, wherein the position change amount of the object is calculated based on a sensing period of the LiDAR sensor.

8. The sensor correction device of claim 1, wherein when a plurality of objects are detected, the processor selects any one object according to a predetermined priority and calculates a position change amount of the selected object.

9. The sensor correction device of claim 1, wherein when a plurality of the objects are detected, the processor calculates the second steering angle based on an average of respective position change amounts of the objects.

10. The sensor correction device of claim 1, wherein the processor further receives a first velocity of a host vehicle from a vehicle velocity sensor, wherein the processor compares a second velocity calculated based on the position change amount of the object with the first velocity, and wherein the processor applies a velocity correction value according to the position change amount of the object to the first velocity when a difference between the first velocity and the second velocity is larger than or equal to a second reference value.

11. A sensor correction method, comprising:

an information reception step receiving image information and a first steering angle from a plurality of image sensors and a steering angle sensor (SAS), respectively;

an object detection step detecting an object from the image information and detecting a position of the object;

a comparison step comparing a second steering angle calculated based on a position change amount of the object with the first steering angle; and a correction step applying an SAS correction value according to the position change amount of the object to the first steering angle when a difference between the first steering angle and the second steering angle is larger than or equal to a first reference value.

12. The sensor correction method of claim 11, wherein the object detection step determines whether the object is a stationary object or a moving object, and wherein the comparison step calculates the second steering angle and compares the calculated second steering angle with the first steering angle only when the object is the stationary object.

13. The sensor correction method of claim 11, wherein the object detection step detects a class of the object, and wherein the comparison step calculates the second steering angle and compares the calculated second steering angle with the first steering angle only when the object is detected as a traffic sign.

14. The sensor correction method of claim 13, wherein the comparison step calculates the second steering angle and compares the calculated second steering angle with the first steering angle only when the traffic sign includes a go-straight signal.

15. The sensor correction method of claim 11, wherein the image sensor includes a camera sensor and a LiDAR sensor, and wherein the image information includes first image information received from the camera sensor and second image information received from the LiDAR sensor.

16. The sensor correction method of claim 15, wherein the object detection step detects a class of the object based on the first image information and detects a distance between the object and a host vehicle based on the second image information.

17. The sensor correction method of claim 15, wherein the position change amount of the object is calculated based on a sensing period of the LiDAR sensor.

18. The sensor correction method of claim 11, wherein when a plurality of objects are detected, the comparison step selects any one object according to a predetermined priority and calculates a position change amount of the selected object.

19. The sensor correction method of claim 11, wherein when a plurality of the objects are detected, the comparison step calculates the second steering angle based on an average of respective position change amounts of the objects.

20. The sensor correction method of claim 11, wherein the information reception step further receives a first velocity of a host vehicle from a vehicle velocity sensor, wherein the comparison step compares a second velocity calculated based on the position change amount of the object with the first velocity, and wherein the correction step applies a velocity correction value according to the position change amount of the object to the first velocity when a difference between the first velocity and the second velocity is larger than or equal to a second reference value.

* * * * *